(12) United States Patent
Philippi et al.

(10) Patent No.: US 7,850,885 B2
(45) Date of Patent: Dec. 14, 2010

(54) DEVICE AND METHOD FOR MANUFACTURING A THREE-DIMENSIONAL OBJECT WITH A HEATED RECOATER FOR A BUILDING MATERIAL IN POWDER FORM

(75) Inventors: Jochen Philippi, Munich (DE); Hans Perret, Munich (DE); Helmar Langer, Unterhaching (DE)

(73) Assignee: EOS GmbH Optical Systems (DE)

( * ) Notice: Subject to any disclaimer, the term of this patent is extended or adjusted under 35 U.S.C. 154(b) by 519 days.

(21) Appl. No.: 11/918,687

(22) PCT Filed: Apr. 28, 2006

(86) PCT No.: PCT/EP2006/003992

§ 371 (c)(1),
(2), (4) Date: Oct. 17, 2007

(87) PCT Pub. No.: WO2006/122645

PCT Pub. Date: Nov. 23, 2006

(65) Prior Publication Data

US 2009/0068376 A1 Mar. 12, 2009

(30) Foreign Application Priority Data

May 13, 2005 (DE) .................. 10 2005 022 308

(51) Int. Cl.
*B28B 1/16* (2006.01)
*B05D 1/12* (2006.01)
(52) U.S. Cl. .................. 264/113; 264/112; 264/299; 427/202
(58) Field of Classification Search .................. 264/113, 264/112, 299; 427/202
See application file for complete search history.

(56) References Cited

U.S. PATENT DOCUMENTS

| 5,582,876 | A | | 12/1996 | Langer et al. | |
|---|---|---|---|---|---|
| 5,647,931 | A | | 7/1997 | Retallick et al. | |
| 5,730,925 | A | * | 3/1998 | Mattes et al. | ............... 264/497 |
| 5,908,569 | A | | 6/1999 | Wilkening et al. | |
| RE37,875 | E | * | 10/2002 | Lawton | ...................... 264/401 |
| 2002/0090313 | A1 | | 7/2002 | Wang et al. | |

(Continued)

FOREIGN PATENT DOCUMENTS

DE          41 34 265 A1        4/1993

(Continued)

*Primary Examiner*—Frederick J Parker
(74) *Attorney, Agent, or Firm*—McDonnell Boehnen Hulber & Berghoff LLP

(57) ABSTRACT

A device and a method for the manufacturing of a three-dimensional object (3) by solidifying of layers (25, 26) of a powder material at locations corresponding to the respective cross-section of the object (3) is provided. The device comprises a recoater (24) for applying the layers of the powder material (27) in the building area (5) which is moveable across the building area (5). The recoater (24) is designed with a rigid blade (21*a*, 21*b*) which is rigidly connected to the recoater (24). For preheating the powder material (27), the recoater (24) is provided with a heating device (20, 23) which is at least partially integrated into the recoater. In this way it is possible to preheat the powder already during or prior to applying it as a layer and thereby shortening the whole building time for the three-dimensional object (3).

12 Claims, 4 Drawing Sheets

U.S. PATENT DOCUMENTS

2004/0104499 A1   6/2004   Keller

FOREIGN PATENT DOCUMENTS

| | | |
|---|---|---|
| DE | 44 15 783 A1 | 10/1995 |
| DE | 195 14 740 C1 | 11/1996 |
| EP | 0 764 079 B2 | 3/1997 |
| WO | WO 87/07538 | 12/1987 |
| WO | WO 92/18323 | 10/1992 |

* cited by examiner

DEVICE AND METHOD FOR MANUFACTURING A THREE-DIMENSIONAL OBJECT WITH A HEATED RECOATER FOR A BUILDING MATERIAL IN POWDER FORM

BACKGROUND OF THE INVENTION

The present invention relates to a recoater for applying powder layers and to a device and a method for manufacturing of a three-dimensional object.

A recoater for applying of powder layers of this type and a device of this type and a method of this type for manufacturing of a three-dimensional object are known from DE 195 14 740. However, the laser sintering device described therein does not comprise a device for preheating of the powder material.

The laser sintering device described in EP 0 764 079 B2 comprises an unheated recoater for applying powder layers and a radiant heater laterally above the building area which serves for preheating a cold powder layer freshly applied onto the building area. This device has the disadvantage that the powder material can be preheated only if it has been applied to the building area. Therefore, the total building time is prolonged by the time necessary for preheating the powder material. As long as the recoater is still moved across the building area, a shadowing of regions of the applied powder layer takes place in addition with the consequence that the preheating of the powder is not effected evenly.

From DE 41 34 265 A1a device for manufacturing of a three-dimensional object by layer-wise solidification of a liquid material is known, wherein a flexible wiper serves for smoothing unevennesses of the surface of the liquid bath. The wiper is provided with a heating element for the accelerated adjustment of the layer thickness.

From WO 87/07538 a device and a method for the production of a three-dimensional body by solidification of layers of a powder material is known, wherein initially layers of a powder material are applied to a surface and then compressed up to a pre-determined thickness by means of a roller. For transforming the powder layers during this compression into a cohesive mass, the roller is heated.

BRIEF SUMMARY OF THE INVENTION

The present invention is based on the object to provide a device and a method for the production of a three-dimensional object by solidifying of layers of a powder material which allow to shorten the building time for the three-dimensional object.

The object is achieved by a recoater and by a device and a method for the manufacturing of a three-dimensional object by means of solidifying of layers of a powder material according to the appended claims.

The invention has the advantage that the preheating of the powder material takes place already prior to or during applying of a layer. After the layer has been applied, the powder material is therefore already preheated, whereby the building time for the manufacturing of the three-dimensional object can be substantially reduced, since the preheating times for freshly applied layers can be avoided or at least substantially reduced.

The invention has further the advantage that the heating power required for the powder preheating of layers already applied to the building area can be decreased. This results in reduced requirements for the control of a heating device for heating the applied layer and in a decrease of the pre-damage of the powder through cycles with high heating power necessary otherwise.

The invention further has the advantage that the preheating of the powder material is effected evenly over the whole layer. During preheating of the powder bed with a radiant heater after applying a layer, the irradiation is partly reflected so that a temperature gradient appears in the layer and the danger of overheating at the surface exists. With the recoater according to the invention, however, the powder material is evenly heated through.

The preheating of the powder material already prior to applying of the layer has the advantage that great temperature differences between the powder bed and the freshly applied layer do not occur. Thus, undesired thermal effects such as the bimetal effect can be avoided. In addition, the process window can be enlarged in this way.

The heated recoater has further the advantage that heat energy is not dissipated from the powder bed through the thermal contact of the recoater with the powder bed. Thus, the thermal conditions in the powder bed are not disturbed by the recoater and in this way constant thermal conditions can be achieved in the powder bed.

A fluidizing device integrated into the recoater has the advantage that the powder material can be fluidized immediately prior to applying and can be simultaneously preheated with the fluidization by means of using preheated gas.

The use of a double blade with a reservoir chamber for the powder material has the advantage of greater contact surfaces for the thermal contact between the powder material and the heated recoater.

BRIEF DESCRIPTION OF THE SEVERAL VIEWS OF THE DRAWINGS

Further features and advantages of the invention result from the description of embodiments with reference to the accompanying drawings.

The drawings show.

DETAILED DESCRIPTION OF THE INVENTION

Figure 1:
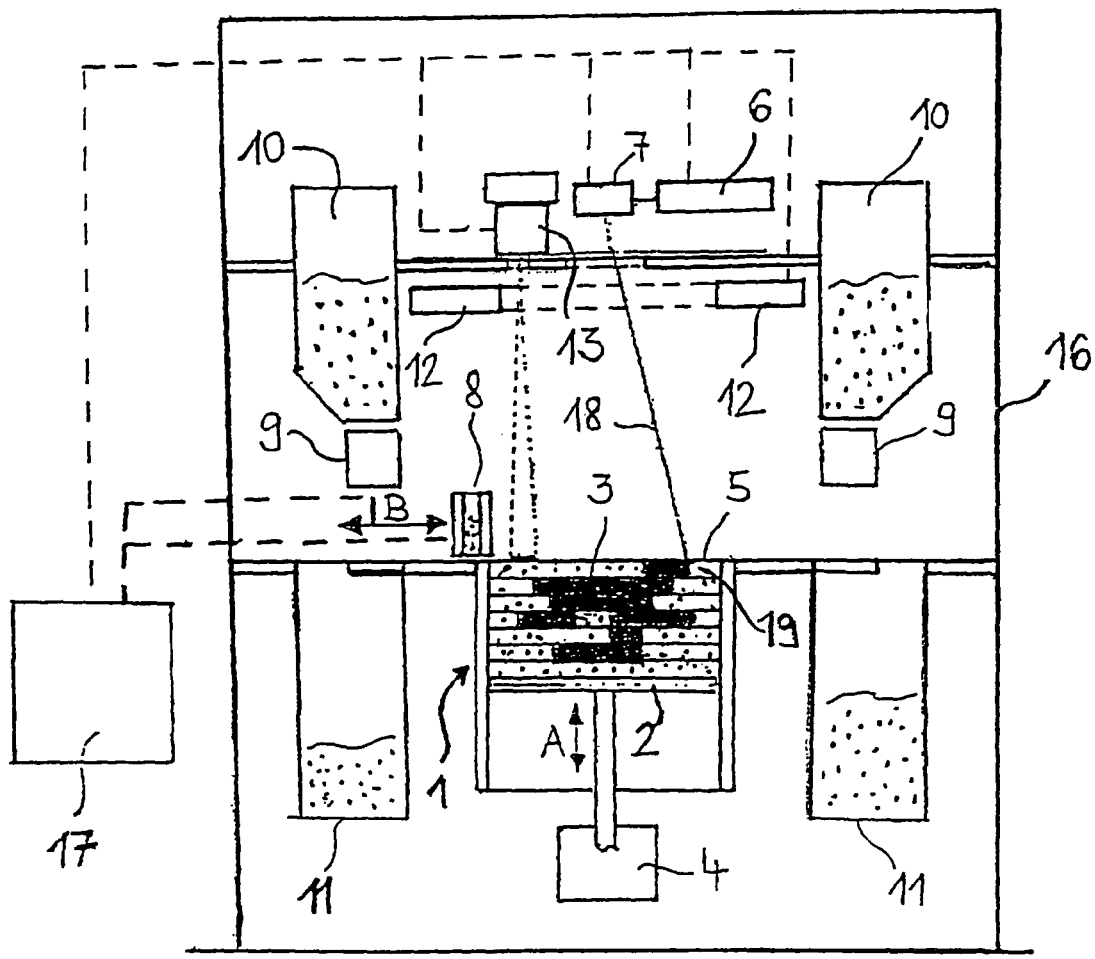
FIG. 1 a schematic representation of an embodiment of the device for manufacturing a three-dimensional object.

FIG. 1 shows a laser sintering device as an embodiment of a device for the manufacturing of a three-dimensional object in which the recoater according to the invention and the method according to the invention are used. The laser sintering device comprises a container 1 open at the top. In the container 1 a support 2 is provided for supporting the three-dimensional object 3 to be built. The support 2 is moveable up and down in the container 1 in a vertical direction A by means of a drive 4. The upper edge of the container 1 defines a building area 5. Above the building area 5 an irradiation device 6 in form of a laser is arranged which emits a directed laser beam 18 which is deflected via a deflection device 7 onto the building area 5. In addition, a recoater 8 is provided for applying a layer of a powder material to be solidified onto the surface of the support 2 or a previously solidified layer. The recoater 8 is moveable to and fro across the building area 5 by means of a drive schematically indicated by the arrows B. The recoater is fed by two metering devices 9 to the left and the right side of the building area from two powder reservoir containers 10. In addition, to the left and right side of the building area, two overflow containers 11 are provided which can receive the excess powder accumulated during recoating.

The device comprises in addition a heating device 12 arranged above the building area 5 for heating the powder bed 19 and in particular for preheating an applied but not yet sintered (solidified) powder layer to the working temperature $T_A$ suitable for sintering. The heating device 12 is designed for example in form of one or a plurality of radiant heaters, such as for example an infrared radiant heater which is or which are arranged above the building area 5 in such a manner that the applied powder layer can be evenly heated.

In a distance above the building area 5 a temperature measuring device 13 is provided which is designed as, for example, a pyrometer or an infrared camera, which serves for measuring the temperature of the finally applied or uppermost powder layer.

The building area is sealed against the surrounding area by a process chamber 16. In this way, the process can be carried out under exclusion of air and oxidation of the powder can be prevented.

A control and/or closed-loop control device 17 serves for controlling and/or closed-loop controlling of the movement B of the recoater 8, the heating power of a recoater heater integrated into the recoater, the movement A of the support 2, the power of the heating device 12, the power of the irradiation device 6 and the deflection by the deflection device 7. For this purpose the control and/or closed-loop control device 17 is connected to the drive of the recoater 8 indicated with the arrow B, the recoater heater integrated into the recoater, the drive 4, the heating device 12, the temperature measuring device 13, the deflection device 7 and to the irradiation device 6.

Figure 2:
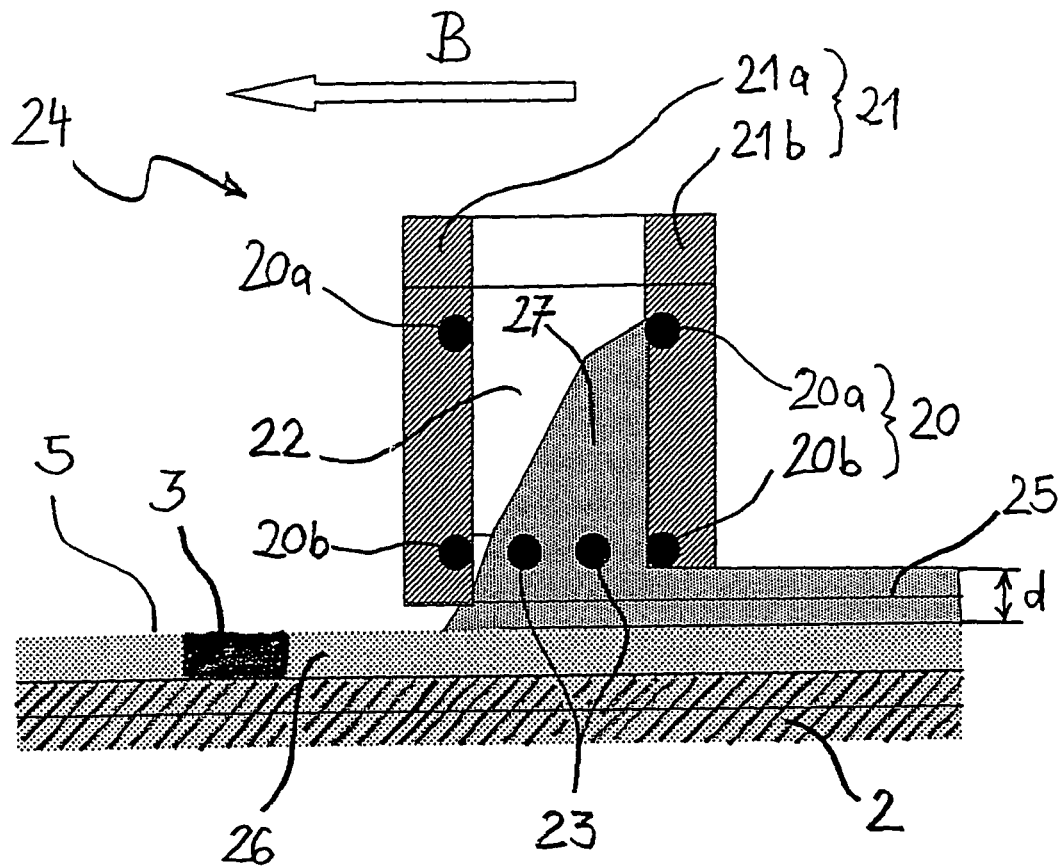
FIG. 2 a schematic representation of a recoater for applying layers of a powder material according to a first embodiment.

FIG. 2 shows a first embodiment of the recoater 24 used in the device for the manufacturing of a three-dimensional object according to the invention, which serves for the applying of layers of a powder material.

The recoater 24 according to a first embodiment is designed as a double blade 21 consisting of two rigid blades 21a and 21b, which are laterally held together by two side walls which are not shown. The two rigid blades 21a and 21b are thereby formed of a rigid material, in particular of metal, a heat resistant plastics or of a ceramics. The two blades and the two side walls form a reservoir chamber 22 being open to the top and to the bottom, which serves for receiving the powder material for one layer.

The recoater heater 20 is integrated in the blades 21a and 21b. The heating of the recoater consists of two heating wires 20a and 20b extending in the inside of the blades 21a and 21b. Further a grid of heating wires 23 is arranged at the lower end of the reservoir chamber 22 which faces the building area.

In the following the operation of the aforementioned laser sintering device according to a method according to a first embodiment is described.

At first, the recoater is located beneath the metering device 9 and the reservoir chamber 20 is filled from the reservoir container 10 with the amount of powder material for one layer.

Thereafter, as shown in FIG. 2, a powder layer 25 is applied to the support 2 or a previously solidified layer 26 by means of moving the recoater 24 in parallel to the surface of the building area. Thereby, the powder material 27 flows out of the reservoir chamber 22 in between the two blades 21a and 21b. Through the thermal contact of the powder material 27 with the heated blades 21a and 21b, in particular with the lower side of the blades, as well as with the grid of heating wires 23 it is preheated prior to applying onto the building area 5 to temperatures close to a working temperature $T_A$ used for the laser sintering.

After applying of the layer 25 of the powder material 27, the solidification at positions corresponding to the cross section of the object in this layer 25 takes place by irradiation with the laser beam 18 in a known manner. Essential for the quality of the finished object is in particular that a temperature of the uppermost powder layer to be solidified has a temperature in a defined process window. If the temperature is above this process window, the powder is sintered already without additional irradiation energy, whereas if the temperature is below the process window, distortions can appear in the solidified layer. In many cases also the so called curl-effect, meaning that the edges of the solidified layer bend or roll up, is attributed to a too low temperature of the uppermost powder layer. The powder layer 25 applied by the recoater 24 therefore has to be heated with the heating device 12 prior to the solidification to a working temperature $T_A$ within the process window for the purpose of achieving good results, in particular for avoiding distortions in the object produced, and then has to be maintained in the process window during the solidification.

For this purpose the temperature of this layer is measured with the temperature measuring device 13 before applying the powder layer. Dependent on the temperature measured thereby, the heating power of the heating device 12 is determined. If the uppermost powder layer is heated to the working temperature $T_A$, the positions corresponding to the cross-section of the object in the layer of the building material are solidified by means of irradiating with the laser 6.

After the solidification of a layer the support 2 is lowered by a distance corresponding to the layer thickness d and the aforementioned steps are repeated until the manufacturing of the three-dimensional object 3 is completed.

Figure 3:
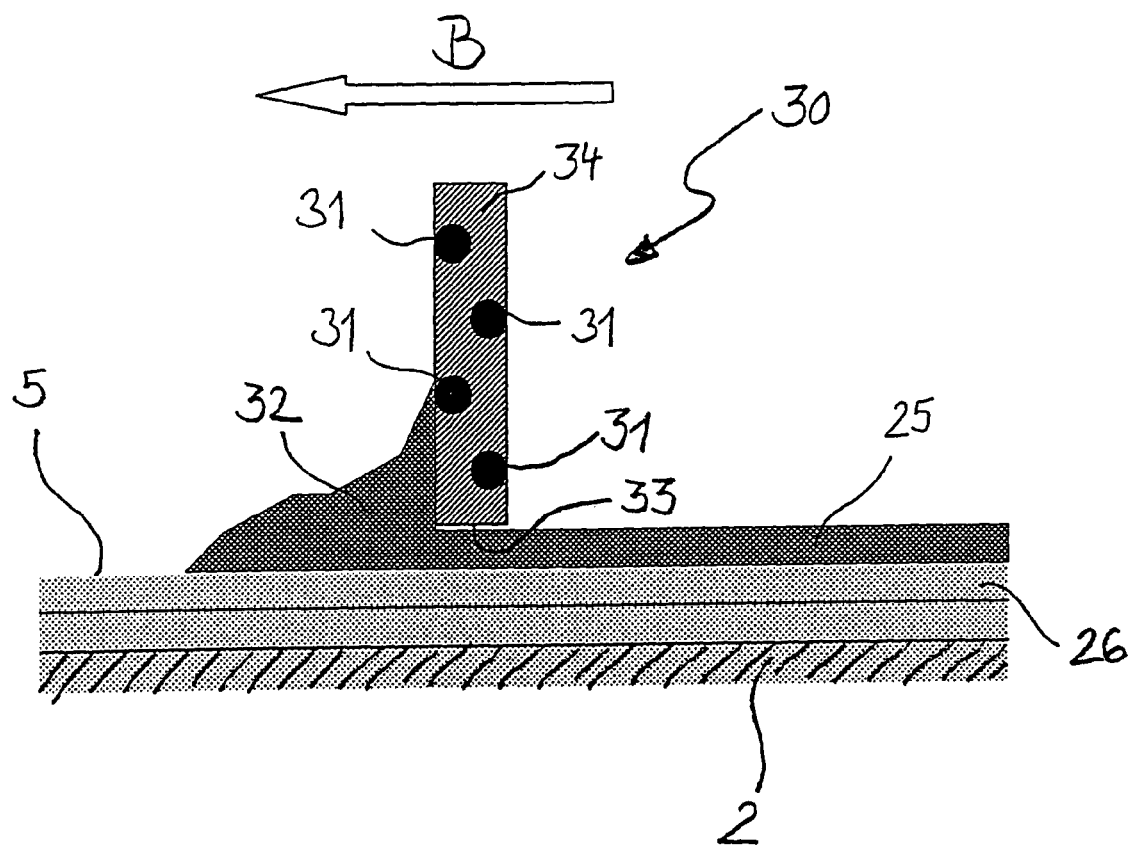
FIG. 3 a schematic representation of a recoater according to a second embodiment.

FIG. 3 shows a second embodiment of the recoater 30 used in the device for the manufacturing of a three-dimensional object according to the invention.

The recoater 30 is designed in the form of a rigid blade 34. Thereby, the rigid blade 34 is formed from a rigid material, in particular from a metal, a heat resistant plastics or a ceramics. In the blade 34 a recoater heater in form of a heating wire 31 is integrated. As in the first embodiment, the recoater 31 is moveable through a drive indicated by the arrow B to and fro between two end positions across the building area. The recoater according to the second embodiment differs from the recoater 24 according to the first embodiment in that the powder reservoir 32 for applying a layer is not enclosed in a reservoir chamber 22 between two blades but is moved by one of the blades during applying of the layer 25 in front of the same. During applying the layer 25, the powder reservoir 32 is in thermal contact with the blade, in particular with the lower side 33 of the blade and is preheated thereby.

Figure 4:
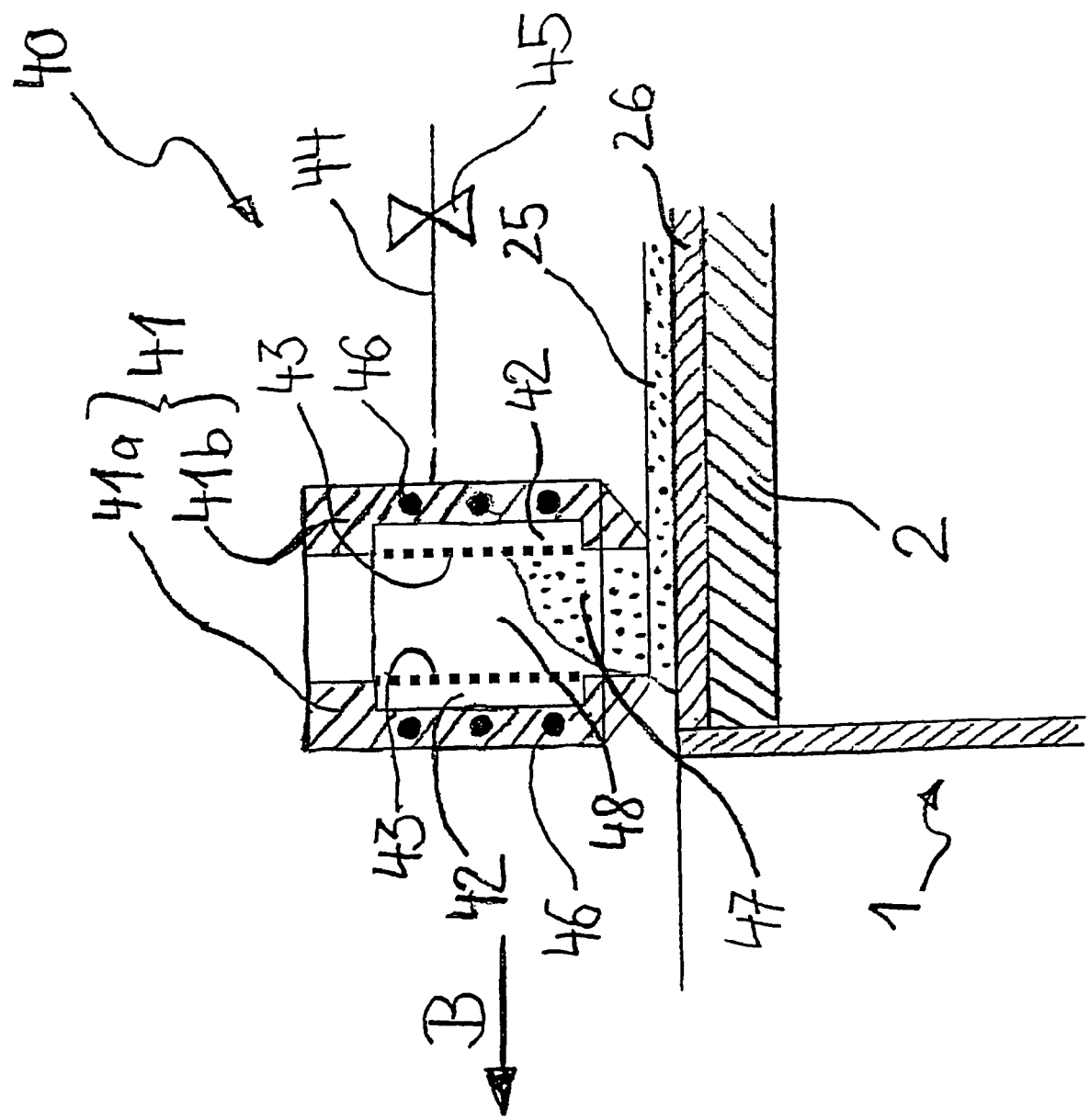
FIG. 4 a schematic representation of a recoater according to a third embodiment.

FIG. 4 shows a third embodiment of the recoater 40 used in the device for the manufacturing of the three-dimensional object according to the invention.

The recoater 40 according to the third embodiment is like the recoater 20 according to the first embodiment designed as double blade 42 of two rigid blades 41a and 41b which are rigidly connected to each other. Thereby, the two rigid blades 41a and 41b are made from a rigid material, in particular from metal, a heat resisting plastics or from a ceramics. A fluidizing device is integrated into the blades 41a and 41b, respectively, which consists of an antechamber 42 and a fluidizing plate 43. To let in nitrogen into the antechamber 42, a supply 44 with a valve 45 is provided. The fluidizing plate 43 comprises many small openings, the diameter of which is smaller than the diameter of the grains of the powder material so that the nitrogen gas can exit through the fluidizing plate 43 from the antechamber 42, but powder material 47 cannot reach the antechamber 42. The walls of the antechamber 42 are heated with a heating device 46 so that the nitrogen gas is heated in the antechamber 42.

In operation the powder material 47 is fluidized between the two blades 41a and 41b prior to and/or during the applying of a layer by the fluidizing devices with preheated nitrogen and is simultaneously preheated. For this purpose an overpressure is generated in these antechambers 42 by means of opening of the valve 44 and letting in nitrogen gas into the antechambers 42 via the supply 44, which leads to a discharge of preheated nitrogen from the openings in the fluidizing plates 43. By means of fluidizing the powder, the flow behaviour of the powder and thus the quality of the applied powder layer can be improved. Simultaneously the powder material 47 is preheated by the preheated nitrogen gas.

Alternatives and modifications of the above described devices and the above described methods are possible.

The invention has been described for a laser sintering device in which a laser is used as a radiation source. Any other radiation source which is able to bring electromagnetic or particle radiation into the powder building material is possible. For example, a radiation source for incoherent light radiation, for infrared radiation, for X-ray radiation or for electron radiation can be used as irradiation source. Accordingly, a building material in powder form is to be used which can be solidified with the respective radiation.

In the above described device an infrared radiation device arranged above the building area is described as heating device for preheating of an already applied layer. Other possibilities to heat a previously applied layer of the building material are conceivable. For example, the circulation of heated air or nitrogen for preheating of the layer can be used, wherein the heated air or the heated nitrogen are guided across the freshly applied layer.

The recoater according to the first and third embodiment has been described with one reservoir chamber, respectively. However, it is also possible to divide the reservoir chamber into several chambers and to realize thereby a recoater with a spatial resolution. In this way, the various chambers can be fed with different powder material.

The recoater heating integrated into the recoater for preheating the powder material has been described in the first and second embodiment of the recoater as a resistance heater. However, any other heating device is conceivable which allows to heat the blade or other parts of the recoater which come into contact with the powder material. In this way, it is possible to indirectly heat the recoater by an irradiation heating or by flowing through with preheated liquid heating means.

It is also possible to preheat the powder material in the recoater directly with a heating device integrated in the recoater, for example with a radiant heating, without heating parts of the recoater thereby.

The recoater according to the first embodiment has been described in such a way that heating wires are provided in the two blades and further a grid of heating wires is provided in the reservoir chamber. However, it is also possible to use only one of these two heating devices.

The supply of the powder material to the recoater has been described in such a way that it is supplied from above from reservoir containers by means of metering devices. It is, however, also possible to supply the powder from below from a reservoir container. In particular, it is possible to provide a reservoir container with a moveable bottom which is open to the top, wherein the bottom is raised for supplying powder material.

The recoater according to the third embodiment has been described in such a way that the preheating of the nitrogen gas by means of heating of the walls of the antechambers is carried out with a resistance heater integrated into the recoater. However, the preheating of the nitrogen gas which is used for the fluidizing device integrated into the recoater can be carried out also in another way, in particular outside of the recoater.

The fluidization in the recoater according to the third embodiment has been described in such a way that it is carried out with nitrogen gas. However, it is also possible to use any other gaseous media such as, for example, air.

The invention has been described in such a way that the powder is preheated by means of a heating device integrated into the recoater during and/or prior to applying a layer. It is additionally possible to preheat the powder already in the reservoir container from which the recoater is filled with a heating device such as for example a resistance heater, heated gas or an irradiation heater.

The invention claimed is:

1. Recoater for applying of powder layers in a device for the manufacturing of a three-dimensional object by solidifying of layers of a powder material at locations corresponding to the respective cross-section of the object,
    wherein the recoater comprises a rigid blade which is rigidly connected to the recoater, and
    wherein the recoater comprises a resistance heater, which is at least partially integrated into the recoater, for preheating the powder material.

2. Recoater according to claim 1, wherein a heating device for heating of the blade is provided.

3. Recoater according to claim 1, wherein the recoater comprises a device for fluidizing the powder material with preheated gas.

4. Recoater according to claim 3, wherein a device for preheating the gas outside the recoater is provided.

5. Recoater according to claim 3, wherein a device for preheating the gas is integrated into the recoater.

6. Recoater according to claim 1, wherein the recoater comprises a reservoir chamber, the walls of which are heatable with a heating device.

7. Recoater according to claim 1, further comprising a control device with which the temperature of the recoater can be controlled.

8. Device for the manufacturing of a three-dimensional object by solidifying of layers of a powder material at locations corresponding to the respective cross section of the object comprising
    a recoater according to claim 1 moveable across a building area.

9. Method for the manufacturing of a three-dimensional object comprising the steps of:
    applying a layer of a powder material onto the surface of a building area by means of a recoater;
    solidifying the layer at locations corresponding to the cross-section of the object by means of introducing electromagnetic radiation or particle radiation;
    repeating the steps (a) and (b) until the three-dimensional object is completed,
    wherein the powder material is preheated prior to or during applying the layer in step (a) with a resistance heater being at least partly integrated into the recoater.

10. Method according to claim 9, wherein the powder material is applied in step (a) with a recoater with a heatable blade by moving the recoater across the building area and
the preheating of the powder material takes place during applying through the heated blade.

11. Method according to claim 9, wherein the powder material with a recoater is applied with a fluidizing chamber and the powder is preheated prior to or during applying of the layer in the fluidizing chamber during fluidizing with preheated gas.

12. Method according to one of claims 9 to 11, wherein the preheating of the powder takes place through contact with the parts of the recoater which are heated by the resistant heater.

* * * * *